Jan. 7, 1964 G. B. EVELYN ETAL 3,116,613
AIR CONDITIONING AND HEAT INTERCEPT SYSTEM
FOR HIGH SPEED VEHICLES
Filed May 31, 1961
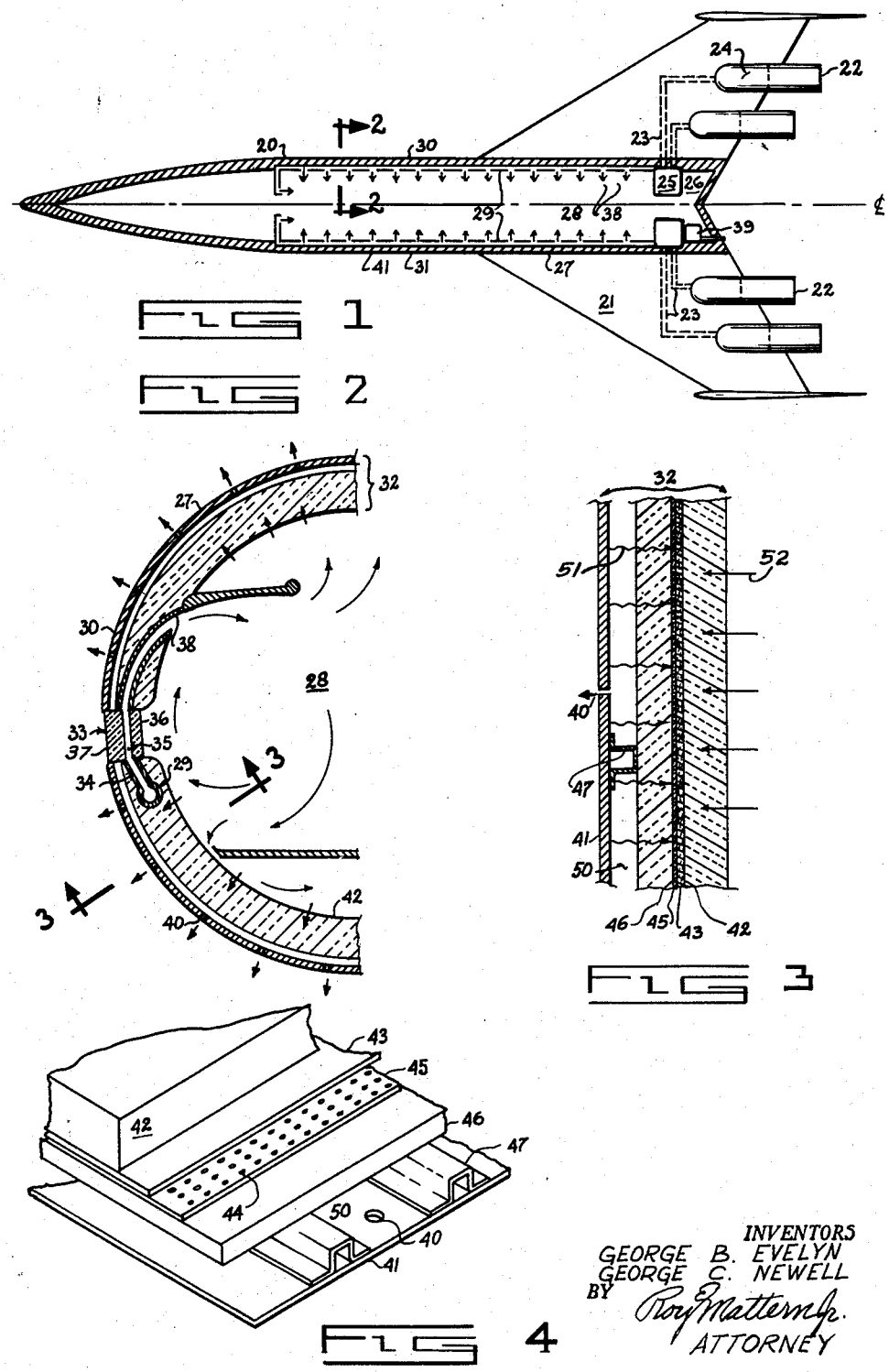
INVENTORS
GEORGE B. EVELYN
GEORGE C. NEWELL
BY
ATTORNEY United States Patent Office 3,116,613
Patented Jan. 7, 1964

3,116,613
AIR CONDITIONING AND HEAT INTERCEPT
SYSTEM FOR HIGH SPEED VEHICLES
George B. Evelyn and George C. Newell, Seattle, Wash.,
assignors to The Boeing Company, Seattle, Wash., a
corporation of Delaware
Filed May 31, 1961, Ser. No. 113,723
4 Claims. (Cl. 62—239)

This invention relates to air conditioning and more particularly to conditioning air for first utilization within compartments of high speed vehicles for the comfort of personnel and the environmental control for equipment, and thereafter for utilization in cooling the insulation of the outer wall of the high speed vehicle itself which is aerodynamically heated while traveling at high speed in the earth's atmosphere. There have been proposals of how to remedy, avoid and/or compensate for the problems created by external heating. In regard to structural soundness some proposals have recommended that the exterior surfaces be ablated on flights and later replaced. Other proposals have called for carrying a coolant in the outer wall structure such as water, propulsion gases, or liquids which will be heated and thereafter conducted away thereby cooling the exterior surface as long as that coolant supply remains. Another proposal has been to constantly circulate a coolant throughout the outer wall structure discharging some of the coolant overboard near the rear of the vehicle and replenishing the balance with new coolants for continuing recirculation. In addition some thought has been given to enlarging the capacity of the present recycling systems used on transports. But for the family group of transports traveling at much higher speeds, any of these proposals by itself or even in combination with another has not proved feasible.

This invention provides a feasible air conditioning system utilizing only one cycle wherein air is conditioned and first utilized throughout the vehicle compartments and thereafter directed overboard on initially radial paths for the most efficient interception of incoming heat. The intercept and transfer occurs entirely within the outer wall structure of the aircraft. In this way the aerodynamic heating never affects the interior compartments of the airplane. The heat never reaches the interior compartments. None has to be conducted away. It is all intercepted in this outer body structure.

This invention therefore has two main purposes: (1) to condition and circulate air for both the comfort of personnel and the reliable operation of the equipment, i.e., environmental control, and in addition (2) to discharge the compartment air to prevent any incoming heat, which is derived from the outer skin which is experiencing aerodynamic heat, from reaching the compartments by intercepting such heat in the outer wall structure of the vehicle.

An object of this invention is to provide a very reliable system of air conditioning and heat interception for a high speed aircraft.

An object of this invention is to provide an air conditioning and heat intercept system which will provide the best operating results at minimum weight.

An object of this invention is to provide an air conditioning and heat intercept system which involves the minimum use of insulation material.

An object of this invention is to reduce the space required for providing for air conditioning systems.

An object of this invention is to reduce the power output requirements for operating an air conditioning system.

An object of this invention is to provide an air conditioning system which eliminates the requirement for any recycling cooler.

Briefly described, the invention is an air conditioning and heat intercept cooling system that: compresses ambient air or receives compressed air from a compression unit such as the compressor of a jet engine; cools the compressed air; distributes the cooled compressed air to both personnel and equipment compartments; controls the compartment environment; intercepts incoming heat in the composite outer wall of the vehicle by discharging conditioned air from the compartments through the outer wall in a flow direction that is counter to the incoming heat flow; and discharges the heat intercepting air overboard through openings in the vehicle's pressure shell.

This invention is described more fully in reference to a preferred embodiment illustrated in the accompanying drawings wherein:

FIGURE 1 is a top view, partially in section, of a high speed aircraft, showing engines and their associated compressors, cooling units, and air distribution paths, FIGURE 2 is a sectional view of half the fuselage taken at line 2—2 of FIGURE 1 showing the circulation of conditioned air through compartments and outer wall channels of the fuselage, FIGURE 3 is a sectional view taken at line 3—3 of FIGURE 2 showing schematically air conducting insulation and structure of the outer wall of the fuselage, and FIGURE 4 is an isometric view, partially in section, showing portions of the various components that form the outer wall of the fuselage.

In this embodiment of the air conditioning and heat intercept system shown in these FIGURES 1 through 4, the system is illustrated, for example, somewhat schematically, as it might be arranged within an aircraft 20 having a delta wing 21 supporting multiple turbine engines 22 along its trailing edge 23.

In such an aircraft the following means of this system are used: A means providing compressed air either compressing ambient air directly or where compressed air is available from turbo jet engines such means will provide for tapping this air supply as the demands of the system require; a means for removing the heat of compression and cooling the air down to a temperature lower than 70° F.; a means for distributing the conditioned air throughout the interiors of the compartments; a means either directly in the system or cooperating with the system whereby the total pressure inside the cabin is kept within safe structural limits; means to conduct the air overboard on a radial basis throughout the outer wall structure, which includes the outer skin, reinforcing members, and various insulation materials all of which are provided with air flow channels; means to filter the air which is leaving the interior compartments of the vehicle so that any impurities in the air will not subsequently clog the channels provided for discharging the air, such filters being placed in a protected position but still reasonably accessible so the entire interior of the airplane would not have to be dismantled for periodic replacement of the filters throughout the operational life of the vehicle; and a means for directly discharging overboard the air which has intercepted the incoming aerodynamic heat, such means from the best heat transfer flow relationships should be located as near as possible to the multiple channeled air exits in the composite insulation, flow control, and filter materials, subject only to the practical limitations of adequate size for cleaning purposes, locations in noncritical structural areas, and placement in areas where the exterior flow conditions about the vehicle enhance the discharge of the counterflowing heat intercepting air through the orifices.

Referring more specifically to the figures again, fresh air, well heated as it passes through the compressor 24 of at least one turbine engine 22, is directed through conduits 23 to cooling units 25 located in the rear 26 of the fuselage 27. After reaching a selected temperature the conditioned air is distributed throughout the aircraft 20 to designated compartments either for increasing personnel comfort or for insuring reliable equipment operation. This conditioned air distribution will be as complete as the demand requirements dictate. For simplicity, the elements of such a system are shown in FIGURES 1 through 4 as serving only one compartment 28. Conduits or ducts 29 extend along either side 30, 31, of the fuselage 27 within the outer wall construction 32. If windows 33 are located within such outer wall 32 construction, the conduits 29 are located below the windows 33 for obtaining the best results in cooling such windows as the conditioned air leaves the conduits 29 through openings 34 and passes through the space 35 formed by window panes 36, 37. Thereafter the conditioned air passes through diffuser ducts 38 located above the windows 33, and enters the compartment 28 providing the proper atmospheric environment for both personnel and equipment (not shown), modified only as necessary by additional air flow controls 39 which regulate the compartment 28 pressures within both human and structural tolerances.

After the conditioned air circulates within the compartment 28, providing the environment conducive to both good personnel performance and reliable equipment operation, it is discharged overboard by at least three ways, through uncontrolled structural leaks (not shown) (25% to 50%); through cabin pressure control valves 39 depending on flight operations (0% to 25%); and through the heat intercept system, terminating as the air leaves the bleed orifice 40.

Throughout this heat intercept system from the compartment 28 to a bleed orifice 40, the conditioned air is consistently intercepting and absorbing heat generated around the fuselage 27. Such interception and absorption is the most effective when the outgoing air flows oppositely to the flow of heat passing through the outer body wall 32, as illustrated in FIGURE 3 where arrows 51 represent the flow of heat inward and arrows 52 represent the flow of air outward through the outer body wall 32.

The strength requirements of aircraft or missile construction require that bleed orifices 40 be located structurally preferably in noncritical structure. The flow rates also indicate that the bleed orifices 40 will be limited in number in order to obtain external orifices 40 of sufficient size for their proper maintenance, the minimum size being about 0.02" dia./per square foot of surface. In addition orifices 40 must be located where exterior flow conditions of ambient air will not stop, reverse or limit the flow of conditioned air through them. In some places the conditioned air may be channeled through longitudinals or ducts and transported to an orifice located in a position where continuous discharge flow is insured. Other than these design limitations on orifice placement, the heat intercept air is discharged on essentially radial paths as indicated in FIGURE 2 to quickly reach the pressure shell or outer skin 41 of the aircraft 20 in the near vicinity of an orifice 40, upon its emergence from insulating portions of the outer wall 32.

Such insulating portions for this intercept system are selectively arranged to provide multiple radial air paths to guide the discharging air through the outer wall 32. An arrangement of these flow guiding materials and other associated structure is shown in FIGURE 4. The air leaving the compartment 28, first encounters a batt 42 of porous or fibrous material that serves as both thermal and acoustic insulation. After passing substantially radially through this insulation batt 42, the air is cleaned as it passes through the adjacent filter 43, of paper-like materials. Thereafter the filtered air is once again controlled to match the incoming opposing heat flow, by passing through numerous spaced perforations 44 in a foil 45. The redistributed air continues on its way overboard by flowing through an outer insulation batt 46 which again radially channels the air flow. This outer batt 46 supports the foil 45, filter 43, and insulation batt 42; and provides air passages past structural reinforcing members or stiffeners 47 that otherwise would obstruct air flow. The unfilled spaces between the outer insulation batt 46, reinforcing members 47, and the pressure shell or outer skin 41, serve as plenum chambers 50 for receiving the departing air as it flows into position for discharge through bleed orifices 40. The departing air, after traveling through this outer body 32, becomes so sufficiently heated enroute that it effectively carries excessive heat overboard.

Other arrangements of flow guiding materials and different materials could be utilized provided the effective heat intercept counter air flow is maintained. The arrangement of the composite layers of the different materials could be altered, or the functions of two or more layers could be combined. As mentioned previously the filtering of the compartment air should occur as soon as possible but aesthetic interior appearances and protection of the filter itself may require an overlay such as the important combined acoustical and heat insulation batt 42. In addition, manufacturing considerations and associated costs may determine the combining or separation of the various batts and layers illustrated in FIGURE 4. In any resulting configuration however the heat intercept requirements must be met by providing a counter air flow through sufficient composite layer thicknesses to insure adequate heat transfer in the outer wall.

A heat intercept system operating in substantially this way meets all of the performance requirements of an air conditioning system for high speed vehicles such as missiles and supersonic aircraft. The use of such a system results in volume, power and weight allowances which are substantially less than other systems depending largely on recirculation equipment. For example, the total estimated weight of a high capacity air recirculating system using fuel and water heat sinks to absorb all the heat conducted into a cabin is 6000 lbs. for a proposed 150 passenger Mach 2.5 aircraft. Whereas, the total estimated weight of the air conditioning and heat intercept cooling system for the same aircraft is 3000 lbs. A weight saving of 50%.

We claim as our invention.

1. A heat intercept air conditioning system for high speed vehicles such as supersonic airplanes and missiles, comprising vehicle structure; air compressors on the vehicle to compress ambient air; air coolers on the vehicle to cool the compressed ambient air; air distribution means on the vehicle to circulate the compressed, cooled air in the interior space of the vehicle; an outer wall structure of the vehicle comprising compositely the vehicles pressure shell having bleed orifices, pressure shell stiffeners, insulation batt covering the vehicles pressure shell stiffeners and spaced above the bleed orifices, perforated thin material adjacent to and coextensive with the insulation batt, a continuous filter adjacent to and coextensive with the perforated thin material, and combined thermal-acoustic insulation batt adjacent to and coextensive with the filter; all the composite outer wall structure providing air flow channels to guide air from the interior space of the vehicle to the bleed orifices in a flow counter to incoming aerodynamic heat flow.

2. An air conditioning and heat intercept system for high speed aircraft and missiles to intercept incoming aerodynamic heat before such heat enters personnel and equipment interior spaces of the aircraft and missiles comprising: means for conditioning air, means for distributing the conditioned air to said interior spaces, and an outer wall structure for channeling flow of air from the interior spaces through the outer wall structure counter to the incoming heat flow before such air is discharged overboard, said outer wall being a composite structure comprising a pressure shell having spaced air bleed exhaust orifices, and multiple layers of air flow channeling materials secured to the interior of the pressure shell, said air flow channeling materials including thermal-acoustic insulation batt to first receive and guide the air from the interior spaces, a filter material to receive and filter the air leaving the thermal-acoustic insulation batt, a perforated thin material to receive and guide the air leaving the filter material, and thermal batt to receive and guide the air leaving the perforated thin material.

3. A composite outer wall construction of a vehicle which functions as a thermal barrier comprising: a pressure shell having bleed orifices, pressure shell stiffeners, insulation batt covering the pressure shell stiffeners and spaced above the bleed orifices, perforated thin material adjacent to and coextensive with the insulation batt, a continuous filter adjacent to and coextensive with the perforated thin material, and combined thermal-acoustic insulation batt adjacent to and coextensive with the filter; the composite outer wall structure providing air flow channels adapted to guide air from the interior of the vehicle to the bleed orifices in a flow counter to incoming aerodynamic heat flow.

4. An outer wall construction for structures subjected to excessive external heating comprising: pressure shell means having spaced air bleed orifices, and multiple layers of air flow channeling materials secured to the interior of the pressure shell and adapted to channel air in opposition to incoming heat flow, said air flow channeling materials including thermal-acoustic insulation batt to first receive and guide the air, a filter material to receive and filter the air leaving the thermal-acoustic insulation batt, a perforated thin material to receive and guide the air leaving the filter material, and thermal batt to receive and guide the air leaving the perforated thin material.

References Cited in the file of this patent

UNITED STATES PATENTS

| | | |
|---|---|---|
| 2,477,932 | King | Aug. 2, 1949 |
| 2,618,470 | Brown et al. | Nov. 18, 1952 |
| 2,755,638 | Sevin | July 24, 1956 |
| 2,922,291 | Fox et al. | Jan. 26, 1960 |
| 2,941,759 | Rice et al. | June 21, 1960 |
| 2,958,482 | Summers | Nov. 1, 1960 |
| 2,963,879 | Paravicini | Dec. 13, 1960 |

FOREIGN PATENTS

| | | |
|---|---|---|
| 859,057 | Great Britain | Jan. 18, 1961 |